UNITED STATES PATENT OFFICE.

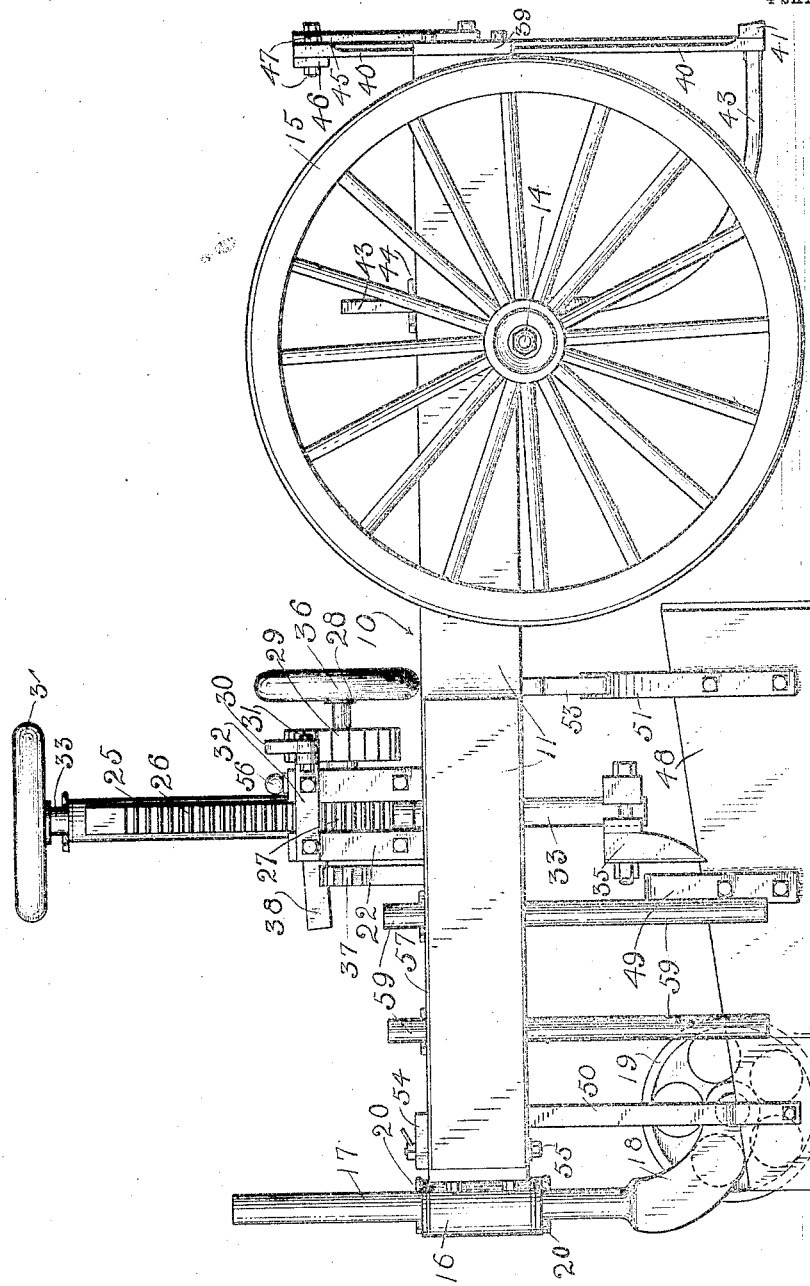

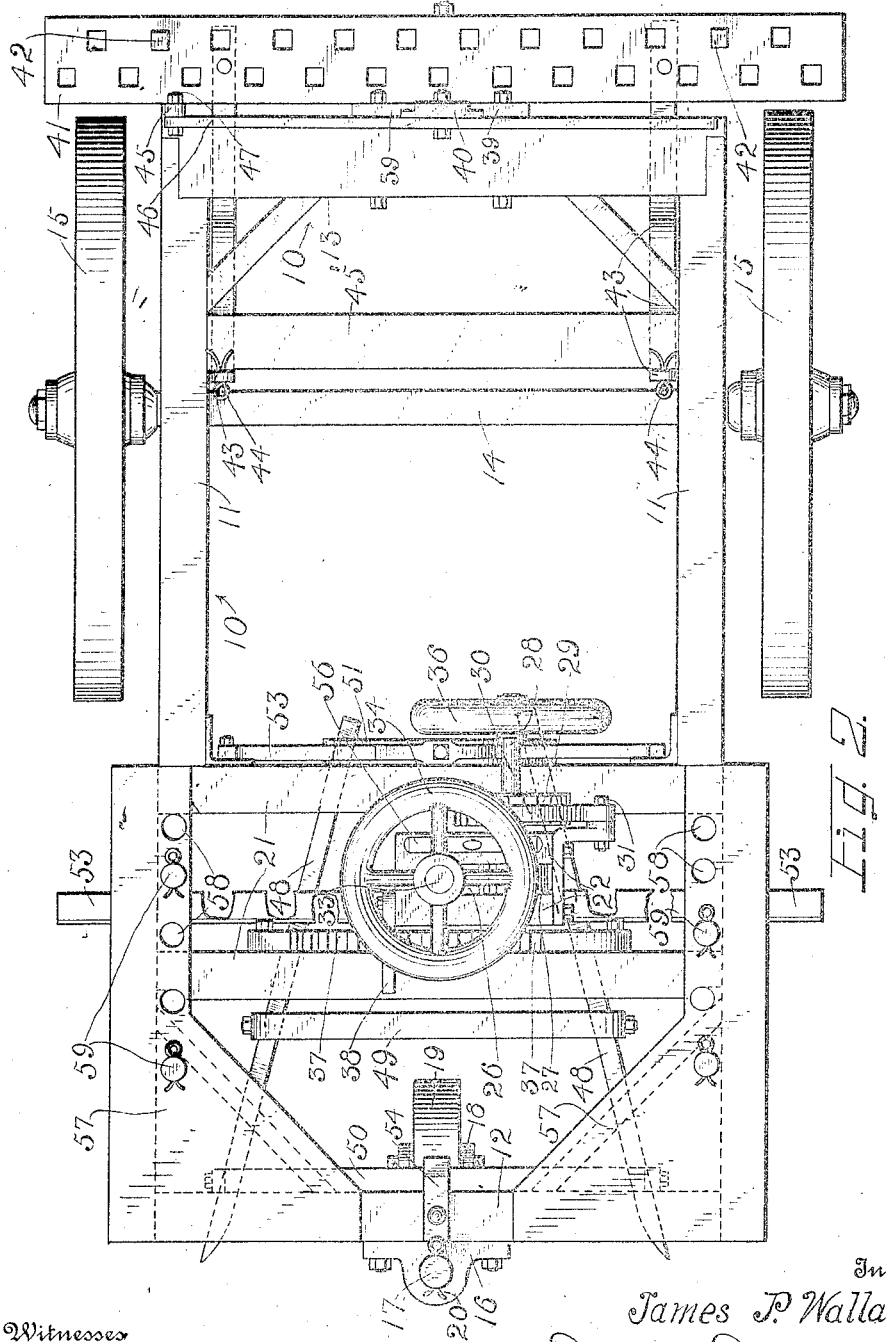

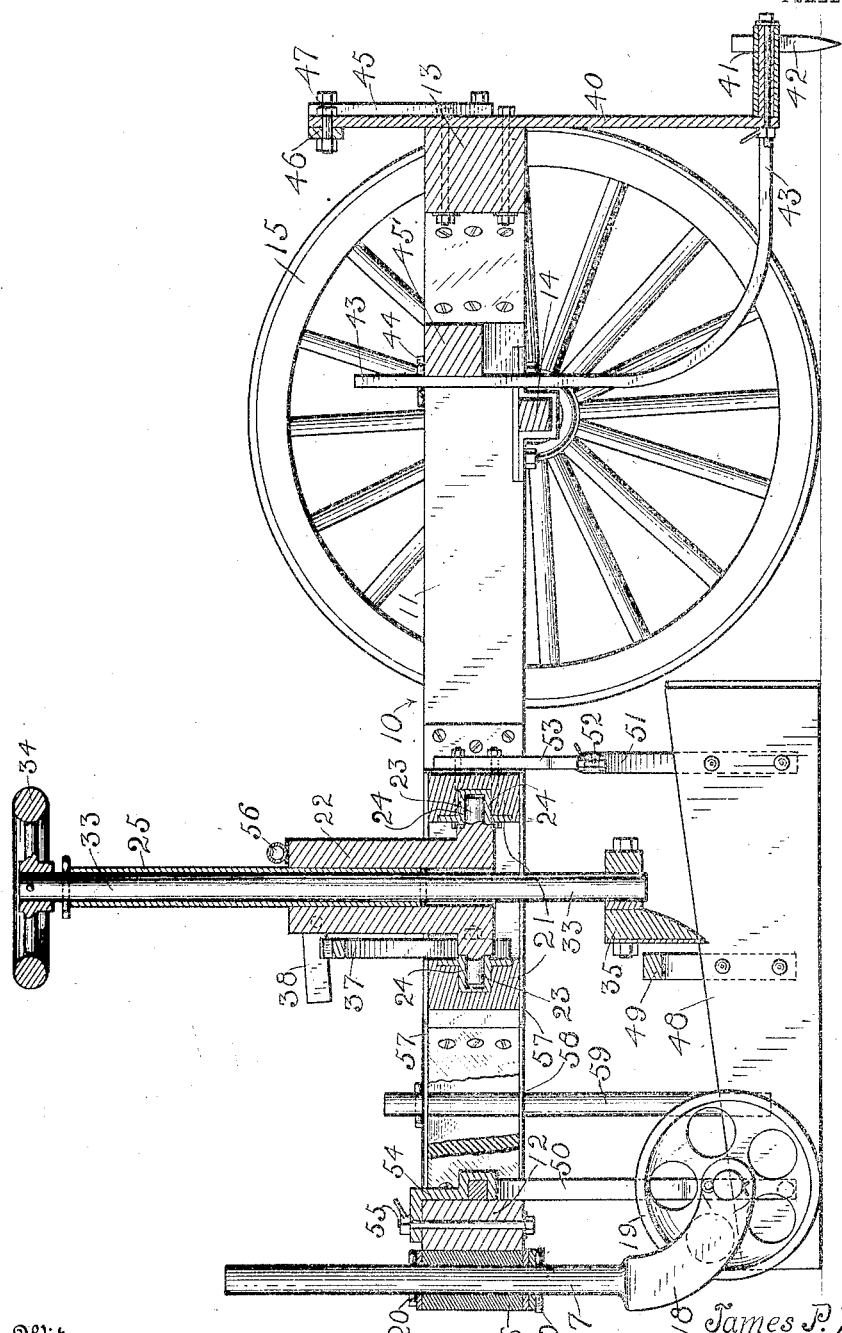

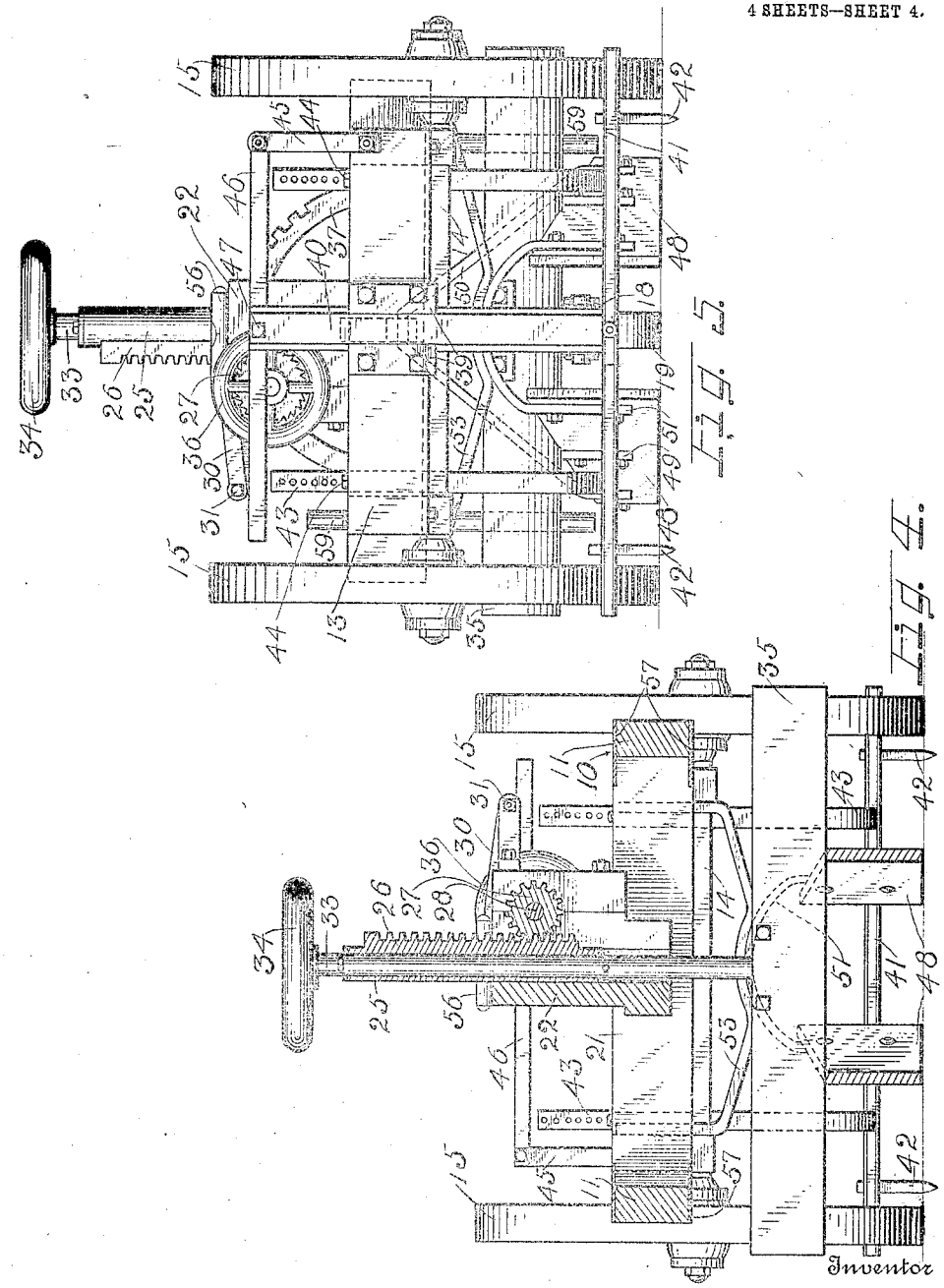

JAMES P. WALLACE, OF COLORADO SPRINGS, COLORADO.

COMBINED LEVELER, MARKER, AND BORDER MACHINE.

960,454.    Specification of Letters Patent.    Patented June 7, 1910.

Application filed November 24, 1909. Serial No. 529,744.

*To all whom it may concern:*

Be it known that I, JAMES P. WALLACE, a citizen of the United States, residing at Colorado Springs, in the county of El Paso, State of Colorado, have invented certain new and useful Improvements in a Combined Leveler, Marker, and Border Machine; and I do hereby declare the following to be a full, clear, and exact description of the invention, such as will enable others skilled in the art to which it appertains to make and use the same.

The invention relates to a farming machine and more particularly to the class of agricultural machines for leveling, bordering, and marking the earth.

The primary object of the invention is the provision of a machine of this character in which the soil may be acted upon for leveling the same for irrigating purposes and that will enable the bordering of the leveled ground so as to confine water upon its area for the proper irrigation of the soil by a gentle and even flow of water over the leveled area of earth.

Another object of the invention is the provision of a machine of this character in which the earth or soil may be put in perfect order for irrigation and planting and that will enable the earth to be marked into straight and even rows for the proper outlaying and cultivation of a crop.

A further object of the invention is the provision of a machine of this character which is simple in construction, readily and easily operated, thoroughly reliable and efficient in its functions and one that is inexpensive in the manufacture.

In the drawings accompanying and forming part of this specification is illustrated the preferred form of embodiment of the invention which to enable those skilled in the art to carry the invention into practice, will be set forth at length in the following description, while the novelty of the invention will be brought out in the claims succeeding the description. However, it is to be understood that changes, variations, and modifications may be made, such as come properly within the scope of the appended claims without departing from the spirit of the invention or sacrificing any of its advantages.

In the drawings:—Figure 1 is a side elevation of a machine constructed in accordance with the invention. Fig. 2 is a top plan view thereof. Fig. 3 is a vertical longitudinal sectional view through the machine. Fig. 4 is a transverse sectional view. Fig. 5 is a rear elevation of the machine.

Similar reference characters indicate corresponding parts throughout the several views in the drawings.

Referring to the drawings by numerals, 10 designates generally the main frame of the machine, which is preferably of substantially rectangular-shape comprising side beams 11, united at opposite ends by front and rear cross beams 12 and 13, to form a unitary open frame structure, and near the rear end of the main frame is journaled in suitable bearings a rear axle 14, supporting the usual traction or ground wheels 15, while at the forward end of the frame centrally thereof is fixed a casting forming a journal box 16, in which is journaled the vertical stem 17, of front forks 18, supporting a guide caster wheel 19, the latter being suitably journaled between the forks. This stem 17, of the front forks is swiveled in the casting and held against vertical displacement therein by means of cotter pins 20, mounted in the stem above and below the front cross bar of the frame. The machine is drawn through a field by draft animals hitched to a tongue (not shown) adapted to be connected in any suitable manner to the front end of the frame.

Mounted transversely of the frame 10, near the forward end thereof are spaced beams 21, between which is adapted to swing a housing 22, having laterally projecting trunnions 23, engaging in suitable bearings 24, mounted in the transverse beams 21, and disposed in a vertical bore in this housing 22, is a vertically adjustable sleeve 25, formed at one side with a toothed rack 26, meshing with a cog gear or pinion 27, keyed to a rotatable shaft 28, journaled in the housing and upon this shaft 28, is also fixed a ratchet wheel 29, the latter engaged by a locking pawl or dog 30, connected by a pivot 31, to an extension arm or bracket 32, suitably fixed upon the housing and by means of this pawl or dog 30, the rotary shaft is held locked against rotation in one direction although said shaft may be turned in an opposite direction for vertically raising the sleeve 25, in the housing. Rotatably held in the sleeve 25, is a tubular standard 33, the upper end of which has fixed thereto a hand wheel 34, to permit the standard to be manually rotated in the sleeve and clamped to the opposite lower end of the standard is a horizontally disposed leveling or scraper blade or bar 35, which latter is adapted to be brought into close relation to the ground for scraping and leveling the same during the advancement of the machine. Fixed to the rotatable shaft 28, is a hand wheel 36, which permits an operator to manually rotate said shaft 28, for vertically adjusting the sleeve 25, in the housing.

Fixed to the frame 10, and rising vertically therefrom in close proximity to the housing 22, is a toothed segment 37, which latter is engaged by a locking dog 38, pivoted to the housing 22, whereby the latter may be locked after being swung to the desired degree on its trunnions 23, for angularly adjusting the scraper or leveling blade or bar 35, relative to the ground.

Fixed to the rear cross beam 13, of the main frame 10, are vertically disposed spaced guide cleats 39, the same engaging a vertically slidable adjustable upright 40, supporting a marker comprising a flat horizontally disposed head or beam 41, containing a plurality of perforations arranged in rows and in which are detachably mounted pins 42, forming marker points for marking the ground to enable seed to be sown in straight rows when planting a crop. Connected to the head or beam 41, at opposite sides of the upright 40, are rearwardly and upwardly curved hangers 43, the upper extremities of which contain rows of perforations for receiving adjusting pins 44, adapted to rest upon a cross beam 45', mounted in the main frame near the rear end thereof. These adjusting pins 44, limit the downward movement of the marker head or beam 41, although permitting automatic raising thereof should the occasion demand. Rising vertically from one corner of the main frame 10, at the rear thereof is a prop or post 45, to which is pivotally connected a raising and lowering lever 46, the latter connected as at 47, with the upright 40, and by means of this lever an operator can vertically adjust the marker relative to the ground.

Adapted to be detachably connected to the main frame of the machine is a border device comprising inwardly converging vertically disposed side boards 48, each of which forwardly tapers and these boards are connected together by a cross bridge piece 49. Also connected near opposite ends of the boards 48, are hanger straps or irons 50, and 51, the latter of which is detachably connected by a bolt member 52, to a depending U-shaped yoke 53, the legs of which are fixed to the main frame. The other strap or iron 50, is detachably engaged in a clip member 54, connected by a bolt 55, centrally to the front cross beam of the main frame of the machine. It being understood of course that when the border attachment is mounted in position in the machine, the leveling blade or bar 35, is elevated so as to rest upon the upper edges of the boards 48, of the border attachment.

Upon the housing 22, is mounted a spirit level 56, which latter is employed to indicate when the blade 35, has been adjusted to the proper degree for the true leveling of the ground.

Mounted at the forward corners of the main frame 10, are plates 57, containing rows of perforations 58, receiving stop pins 59, which latter are adapted to be adjusted to engage the leveling blade 35, to hold it relatively fixed against horizontal swinging movement when adjusted for scraping or leveling the ground.

In operation presuming that it is desired to bring the ground or soil into a level condition, the leveling blade 35, is adjusted to act upon the soil for scraping and leveling the same. It being understood of course that the border attachment has been previously removed from the machine. Now should it be desired to mark the previously leveled ground it is necessary to adjust the marker head 41 so that the marker pins 42, carried thereby will engage the ground and as the machine is advanced they will mark lines upon the earth for the subsequent planting of rows of seed.

Should it be desired to border the level earth by ridges or mounds an operator elevates the leveling device and connects the border attachment to the main frame so that when the machine is advanced the said border attachment will act upon the earth to lift it and form the same into ridges or mounds.

From the foregoing it is thought that the construction and operation of the device will be clearly obvious without the necessity of a more extended explanation, and therefore the same has been omitted.

What is claimed is:—

1. The combination with a wheeled frame, of a housing trunnioned in the frame to permit swinging movement thereof, a vertically adjustable sleeve supported by the housing, and a leveling device having a stem rotatably mounted in the sleeve.

2. The combination with a wheeled frame, of a housing trunnioned in the frame to permit swinging movement thereof, a vertically adjustable sleeve supported by the housing, a leveling device having a stem rotatably mounted in the sleeve, and stop means limiting the rotation of the leveling device.

3. The combination with a wheeled frame, of a housing trunnioned in the frame to permit swinging movement thereof, a vertically adjustable sleeve supported by the housing, a leveling device having a stem rotatably mounted in the sleeve, stop means limiting the rotation of the leveling device, and means locking the sleeve in vertically adjusted position.

4. The combination with a wheeled frame, of a housing trunnioned in the frame to permit swinging movement thereof, a vertically adjustable sleeve supported by the housing, a leveling device having a stem rotatably mounted in the sleeve, stop means limiting the rotation of the leveling device, means locking the sleeve in vertically adjusted position, and means for locking the housing in its swung position.

5. The combination with a wheeled frame, of a U-shaped yoke depending therefrom, a clip carried centrally at the forward end of the frame, a border device having outwardly diverging side boards, and hanger means for uniting the side boards and detachably connected to the clip and the yoke for mounting the border device on the frame.

In testimony whereof, I affix my signature, in presence of two witnesses.

JAMES P. WALLACE.

Witnesses:
W. H. EASTON,
CHAS. C. AHROLD.